United States Patent
Ahn et al.

(10) Patent No.: US 8,973,028 B2
(45) Date of Patent: Mar. 3, 2015

(54) INFORMATION STORAGE MEDIUM STORING METADATA AND METHOD OF PROVIDING ADDITIONAL CONTENTS, AND DIGITAL BROADCAST RECEPTION APPARATUS

(75) Inventors: Sung-wook Ahn, Seoul (KR); Mun-jo Kim, Suwon-si (KR); In-chul Hwang, Suwon-si (KR); O-hoon Kwon, Suwon-si (KR); Eun-hee Rhim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 12/361,137

(22) Filed: Jan. 28, 2009

(65) Prior Publication Data

US 2009/0193456 A1     Jul. 30, 2009

Related U.S. Application Data

(60) Provisional application No. 61/024,314, filed on Jan. 29, 2008.

(30) Foreign Application Priority Data

Dec. 12, 2008   (KR) ................. 10-2008-0126575

(51) Int. Cl.
*H04N 7/10*   (2006.01)
*G06Q 30/00*  (2012.01)
(Continued)

(52) U.S. Cl.
CPC .............. *H04H 20/93* (2013.01); *H04H 20/10* (2013.01); *H04N 7/163* (2013.01);
(Continued)

(58) Field of Classification Search
CPC .......... H04N 21/23424; H04N 21/262; H04N 21/26241; H04N 21/26258; H04N 21/2668; H04N 21/4316; H04N 21/4331; H04N 21/44; H04N 21/44016; H04N 21/458; H04N 21/4622; H04N 21/812; H04N 21/8543; H04N 21/858; H04N 21/8586
USPC ....................... 725/32, 34–36, 109–110, 112; 705/14.4, 14.41, 14.49, 14.53, 705/14.57–14.62
See application file for complete search history.

(56) References Cited

U.S. PATENT DOCUMENTS 5,333,091 A * 7/1994 Iggulden et al. ............... 386/281
5,959,623 A * 9/1999 van Hoff et al. ............... 715/719
(Continued)

FOREIGN PATENT DOCUMENTS

CN    1744691 A    3/2006
CN    1781085 A    5/2006
(Continued)

OTHER PUBLICATIONS

European Search Report issued Jul. 7, 2011 in counterpart European Patent Application No. 09705414.2.
(Continued)

*Primary Examiner* — An Son P Huynh
(74) *Attorney, Agent, or Firm* — Sughrue Mion, PLLC

(57) ABSTRACT

Disclosed are an information storage medium storing metadata for providing additional content during a broadcast program, the metadata including information indicating whether to insert second additional content instead of first additional content, which is underlying additional content of the broadcast program, and a locator of the second additional content, a method of providing additional content by using the same, and a digital broadcast reception apparatus.

9 Claims, 5 Drawing Sheets

(51) Int. Cl.
*H04H 20/93* (2008.01)
*H04H 20/10* (2008.01)
*H04N 7/16* (2011.01)
*H04N 21/4722* (2011.01)
*H04N 21/81* (2011.01)
*H04N 21/845* (2011.01)
*H04N 21/8547* (2011.01)
*H04N 21/858* (2011.01)
*H04H 60/73* (2008.01)

(52) U.S. Cl.
CPC ........ *H04N 21/4722* (2013.01); *H04N 21/812* (2013.01); *H04N 21/8456* (2013.01); *H04N 21/8547* (2013.01); *H04N 21/8586* (2013.01); *H04H 60/73* (2013.01)
USPC .................. 725/32; 725/34; 725/35; 725/36; 725/59; 725/60; 725/61; 725/110; 725/112; 705/14.4; 705/14.41; 705/14.49; 705/14.61; 705/14.67; 705/14.68

(56) References Cited

U.S. PATENT DOCUMENTS

| | | | |
|---|---|---|---|
| 6,002,393 A * | 12/1999 | Hite et al. | 715/719 |
| 6,029,045 A | 2/2000 | Picco et al. | |
| 6,141,010 A * | 10/2000 | Hoyle | 715/854 |
| 6,169,542 B1 * | 1/2001 | Hooks et al. | 715/719 |
| 6,177,931 B1 | 1/2001 | Alexander et al. | |
| 6,240,555 B1 * | 5/2001 | Shoff et al. | 725/110 |
| 6,282,713 B1 * | 8/2001 | Kitsukawa et al. | 725/36 |
| 6,415,438 B1 | 7/2002 | Blackketter et al. | |
| 6,425,127 B1 * | 7/2002 | Bates et al. | 725/32 |
| 6,505,169 B1 * | 1/2003 | Bhagavath et al. | 705/14.66 |
| 6,513,069 B1 * | 1/2003 | Abato et al. | 709/238 |
| 6,530,082 B1 | 3/2003 | Del Sesto et al. | |
| 6,668,378 B2 | 12/2003 | Leak et al. | |
| 6,698,020 B1 * | 2/2004 | Zigmond et al. | 725/34 |
| 6,738,978 B1 * | 5/2004 | Hendricks et al. | 725/35 |
| 6,766,426 B1 | 7/2004 | Sugiyama | |
| 7,079,176 B1 | 7/2006 | Freeman et al. | |
| 7,134,132 B1 * | 11/2006 | Ngo et al. | 725/34 |
| 7,150,030 B1 * | 12/2006 | Eldering et al. | 725/46 |
| 7,222,155 B1 * | 5/2007 | Gebhardt et al. | 709/204 |
| 7,263,711 B1 | 8/2007 | Estipona | |
| 7,444,659 B2 | 10/2008 | Lemmons | |
| 7,653,923 B2 * | 1/2010 | Flickinger | 725/36 |
| 7,694,318 B2 * | 4/2010 | Konig et al. | 725/32 |
| 7,706,740 B2 * | 4/2010 | Collins et al. | 455/3.01 |
| 7,802,276 B2 * | 9/2010 | Swix et al. | 725/14 |
| 7,849,135 B2 | 12/2010 | Agrawal et al. | |
| 8,418,195 B1 * | 4/2013 | Page et al. | 725/32 |
| 2002/0038383 A1 * | 3/2002 | Ullman et al. | 709/245 |
| 2002/0062250 A1 * | 5/2002 | Nagano et al. | 705/14 |
| 2002/0083441 A1 * | 6/2002 | Flickinger et al. | 725/32 |
| 2002/0083445 A1 * | 6/2002 | Flickinger et al. | 725/35 |
| 2002/0144262 A1 * | 10/2002 | Plotnick et al. | 725/32 |
| 2002/0156909 A1 * | 10/2002 | Harrington | 709/231 |
| 2002/0162115 A1 | 10/2002 | Bruckner et al. | |
| 2002/0184091 A1 * | 12/2002 | Pudar | 705/14 |
| 2002/0194595 A1 | 12/2002 | Miller et al. | |
| 2002/0199201 A1 * | 12/2002 | Kurauchi | 725/104 |
| 2003/0056219 A1 * | 3/2003 | Reichardt et al. | 725/60 |
| 2003/0101454 A1 * | 5/2003 | Ozer et al. | 725/42 |
| 2003/0145338 A1 * | 7/2003 | Harrington | 725/136 |
| 2003/0149975 A1 * | 8/2003 | Eldering et al. | 725/34 |
| 2003/0177490 A1 * | 9/2003 | Hoshino et al. | 725/34 |
| 2003/0219041 A1 | 11/2003 | Oh | |
| 2003/0231854 A1 | 12/2003 | Derrenberger | |
| 2004/0015999 A1 * | 1/2004 | Carlucci et al. | 725/136 |
| 2004/0093253 A1 * | 5/2004 | Iijima | 705/8 |
| 2004/0098305 A1 * | 5/2004 | Truong et al. | 705/14 |
| 2004/0133909 A1 * | 7/2004 | Ma | 725/34 |
| 2004/0194130 A1 | 9/2004 | Konig et al. | |
| 2004/0194131 A1 * | 9/2004 | Ellis et al. | 725/34 |
| 2004/0236844 A1 | 11/2004 | Kocherlakota | |
| 2005/0028195 A1 * | 2/2005 | Feinleib et al. | 725/32 |
| 2005/0039205 A1 * | 2/2005 | Riedl | 725/32 |
| 2005/0044361 A1 | 2/2005 | Chang et al. | |
| 2005/0120386 A1 | 6/2005 | Stone | |
| 2005/0177421 A1 * | 8/2005 | Fujimoto | 705/14 |
| 2005/0227678 A1 | 10/2005 | Agrawal et al. | |
| 2005/0235318 A1 * | 10/2005 | Grauch et al. | 725/46 |
| 2005/0266835 A1 | 12/2005 | Agrawal et al. | |
| 2006/0041596 A1 | 2/2006 | Stirbu et al. | |
| 2006/0093325 A1 | 5/2006 | Imai et al. | |
| 2006/0123443 A1 * | 6/2006 | Hamilton et al. | 725/32 |
| 2006/0126551 A1 | 6/2006 | Delaunay et al. | |
| 2006/0200534 A1 | 9/2006 | Nagai et al. | |
| 2006/0217072 A1 | 9/2006 | Poyhonen et al. | |
| 2007/0039033 A1 | 2/2007 | Ota | |
| 2007/0042737 A1 | 2/2007 | Peusens | |
| 2007/0064637 A1 | 3/2007 | Lee et al. | |
| 2007/0064712 A1 | 3/2007 | Lee et al. | |
| 2007/0127377 A1 | 6/2007 | Brocke et al. | |
| 2007/0130012 A1 * | 6/2007 | Yruski et al. | 705/14 |
| 2007/0157249 A1 * | 7/2007 | Cordray et al. | 725/58 |
| 2007/0157281 A1 | 7/2007 | Ellis et al. | |
| 2007/0226761 A1 * | 9/2007 | Zalewski et al. | 725/32 |
| 2007/0233879 A1 | 10/2007 | Woods et al. | |
| 2007/0234207 A1 * | 10/2007 | Turakhia | 715/530 |
| 2007/0249367 A1 * | 10/2007 | Sato et al. | 455/456.3 |
| 2007/0265932 A1 | 11/2007 | Im et al. | |
| 2008/0002690 A1 | 1/2008 | Ver Steeg et al. | |
| 2008/0114861 A1 * | 5/2008 | Gildred | 709/219 |
| 2008/0127259 A1 * | 5/2008 | Hong et al. | 725/39 |
| 2008/0133650 A1 | 6/2008 | Saarimaki et al. | |
| 2008/0134236 A1 * | 6/2008 | Iijima et al. | 725/34 |
| 2008/0168496 A1 * | 7/2008 | Lee et al. | 725/39 |
| 2008/0255943 A1 * | 10/2008 | Morten et al. | 705/14 |
| 2008/0256232 A1 | 10/2008 | Fleury et al. | |
| 2008/0319850 A1 * | 12/2008 | Shaul et al. | 705/14 |
| 2009/0031339 A1 * | 1/2009 | Pickens et al. | 725/32 |
| 2009/0138441 A1 * | 5/2009 | Valentine et al. | 707/3 |
| 2009/0171749 A1 * | 7/2009 | Laruelle et al. | 705/10 |
| 2009/0265734 A1 * | 10/2009 | Dion et al. | 725/34 |
| 2010/0031162 A1 * | 2/2010 | Wiser et al. | 715/747 |
| 2010/0169826 A1 * | 7/2010 | Keereepart et al. | 715/794 |

FOREIGN PATENT DOCUMENTS

| | | | |
|---|---|---|---|
| EP | 1 067 792 A2 | 1/2001 | |
| JP | 2001211410 A | 8/2001 | |
| KR | 10-2001-0049666 A | 6/2001 | |
| KR | 10-2003-0091396 A | 12/2003 | |
| KR | 1020050020165 A | 3/2005 | |
| KR | 1020060048848 A | 5/2006 | |
| KR | 1020060073071 A | 6/2006 | |
| KR | 1020070011442 A | 1/2007 | |
| KR | 1020070065501 A | 6/2007 | |
| KR | 1020070066616 A | 6/2007 | |
| KR | 1020070094567 A | 9/2007 | |
| KR | 1020070100966 A | 10/2007 | |
| KR | 100940981 B1 | 2/2010 | |
| WO | WO 98/53611 | * 11/1998 | 7/173 |
| WO | 2007/056077 A2 | 5/2007 | |
| WO | 2007/096815 A1 | 8/2007 | |

OTHER PUBLICATIONS

European Search Report issued Jul. 25, 2011 in counterpart European Patent Application No. 09704986.0.

International Search Report for International Application No. PCT/KR2009/000372 issued on Aug. 27, 2009 [PCT/ISA/210].

International Search Report issued on Jul. 31, 2009 in International Application No. PCT/KR2009/000359.

U.S Non-Final Office Action issued on Mar. 28, 2011 in corresponding U.S. Appl. No. 12/360,287.

U.S. Non-Final Office Action issued on Nov. 8, 2011 in corresponding U.S. Appl. No. 12/360,287.

(56) References Cited

OTHER PUBLICATIONS

Communication dated Mar. 11, 2013 issued by the State Intellectual Property Office of P.R. China in counterpart Chinese Patent Application No. 200980103346.1.

Office Action, dated May 27, 2013, issued by the Indonesian Patent Office in counterpart Indonesian Patent Application No. W-00201002922.

Communication from the Indonesian Intellectual Property Office dated Sep. 4, 2012, in a counterpart application No. W-00201002921.

Communication dated Sep. 6, 2012 from the State Intellectual Property Office of P.R. China in a counterpart application No. 200980103346.1.

Office Action dated Mar. 26, 2012, issued by the U.S. Patent and Trademark Office in U.S. Appl. No. 12/360,287.

Communication dated Feb. 29, 2012, issued by the State Intellectual Property Office of P.R. China in counterpart Chinese Application No. 200980103346.1.

Office Action issued Jun. 6, 2012 by the State Intellectual Property Office of the People's Republic of China in counterpart Chinese Application No. 200980103346.1.

Communication, Issued by the Korean Intellectual Property Office, Dated Sep. 22, 2014, in counterpart Korean Application No. 10-2008-0130445.

Communication, Issued by the State Intellectual Property Office of P.R. China, Dated Oct. 22, 2014, in counterpart Chinese Application No. 200980103449.8.

Communication issued by the State Intellectual Property Office of P.R. China, for corresponding Application No. 200980103346.1 dated Dec. 31, 2014.

* cited by examiner

FIG. 4

```
<SegmentInformation segmentId="adv-service-adbreak01">
  <Description>
    <Title> ADVERTISEMENT 1 - adbreak1</Title>
    <RelatedMaterial>                                                      /— 410
      <MediaLocator priority = 0x01> —411
        <mpeg7:MediaUri>http://advertisement.co.kr/ads/adbreak1_underlying.html</mpeg7:MediaUri> —412
      </MediaLocator>
      <MediaLocator priority = 0x00> —413
        <mpeg7:MediaUri>http://advertisement.co.kr/ads/adbreak1_insertion.html </mpeg7:MediaUri> —414
      </MediaLocator>
    </RelatedMaterial>
  </Description>
  <SegmentLocator>                           /— 420
    <MediaRelTimePoint>PT00H20M14S</MediaRelTimePoint> —421
    <MediaDuration>PT00H00M30S</MediaDuration> —422
  </SegmentLocator>
</SegmentInformation>
```

FIG. 5

```
<MediaLocator priority = 0x01>
    <mpeg7:MediaUri>http://advertisement.co.kr/ads/adbreak1_UNDERLYING.html</mpeg7:MediaUri>
</MediaLocator>
<MediaLocator priority = 0x02>    ~ 501
    <mpeg7:MediaUri> http://advertisement.co.kr/ads/adbreak1_INSERTION.html  </mpeg7:MediaUri>
</MediaLocator>
```

INFORMATION STORAGE MEDIUM STORING METADATA AND METHOD OF PROVIDING ADDITIONAL CONTENTS, AND DIGITAL BROADCAST RECEPTION APPARATUS

CROSS-REFERENCE TO RELATED PATENT APPLICATION

This application claims priority from Korean Patent Application No. 10-2008-0126575, filed on Dec. 12, 2008, in the Korean Intellectual Property Office, and the benefit of U.S. Provisional Patent Application No. 61/024,314, filed on Jan. 29, 2008, in the U.S. Patent and Trademark Office, the disclosures of which are incorporated herein in its entirety by reference.

BACKGROUND OF THE INVENTION

1. Field of the Invention

The present invention relates to a digital broadcast, and more particularly, to an information storage medium storing data for providing additional contents such as advertisements, a method of providing additional contents, and a digital broadcast reception apparatus.

2. Description of the Related Art

The fusion of the communication and broadcast fields has accelerated due to the recent digital convergence resulting in the dramatic popularization of internet protocol television (IPTV) service, which provides digital video service and two-way data service via a high-speed broadband network. Furthermore, digital cable TV services which are based on hybrid filter coaxial (HFC) networks have also contributed to the digitalization of the paid broadcast service market. Service providers providing such digital broadcast services are also interested in additional contents that are to be provided with broadcast programs. Especially, broadcast advertising, which is the fastest and the most precise means of delivering vivid advertising images of a product and/or a service both visually and audibly, is the major source of income to broadcast providers. Therefore, more efficient methods of advertising which use the advantages of digital broadcasting are being developed.

SUMMARY OF THE INVENTION

An aspect of the present invention provides an information storage medium storing data for providing additional contents such as advertisements, a method of providing additional contents by using the metadata, and a digital broadcast reception apparatus.

According to an aspect of the present invention, there is provided an information storage medium storing metadata for providing additional content during a broadcast program, the metadata including information indicating whether to insert second additional content instead of first additional content, which is underlying additional content of the broadcast program, and a locator of the second additional content.

The information indicating whether to insert the second additional content includes priority information with respect to the first additional content and the second additional content, and instructs the one of the first and second additional contents having the higher priority to be reproduced.

The information storage medium may further include information regarding time points to reproduce the first additional content or the second additional content.

The information storage medium may further include a locator of the first additional content. The locator of the second additional content may be written in the form of URI (uniform resource identifier).

According to another aspect of the present invention, there is provided a method of providing additional content, the method including receiving metadata regarding a broadcast program, decoding the metadata and determining whether to insert second additional content instead of first additional content, which is underlying additional content of the broadcast program, if it is determined to insert the second additional content, obtaining a locator of the second additional content from the metadata, and receiving the second additional content by using the obtained locator and reproducing the second additional content.

The determination of whether to insert the second additional content may include comparing priorities of the first additional content and the second additional content, the priorities being included in the metadata, and determining the one of the first and second additional contents having the higher priority to be reproduced.

The method may further include decoding the metadata and determining a time point to begin reproduction of the first additional content or the second additional content.

The method may further include, if it is determined to reproduce the first additional content, obtaining a locator of the first additional content from the metadata, and receiving the first additional content by using the locator and reproducing the first additional content.

According to another aspect of the present invention, there is provided a computer readable recording medium having recorded thereon the method of providing additional content.

According to another aspect of the present invention, there is provided a digital broadcast reception apparatus including a reception unit which receives a broadcast program, metadata regarding the broadcast program, and additional content, a playback unit which produces data received by the reception unit, and a control unit which determines whether to insert second additional content instead of first additional content, which is underlying additional content of the broadcast program, and, if it is determined to insert the second additional content, controls the reception unit and the playback unit to receive the second additional content by using a locator thereof included in the metadata and to reproduce the second additional content.

BRIEF DESCRIPTION OF THE DRAWINGS

The above and other features and advantages of the present invention will become more apparent by describing in detail exemplary embodiments thereof with reference to the attached drawings in which:

FIG. 4 illustrates metadata in the case where alternative advertisement content is inserted according to another exemplary embodiment of the present invention; and FIG. 5 illustrates metadata in the case where alternative advertisement content is not inserted according to another exemplary embodiment of the present invention.

DETAILED DESCRIPTION OF EXEMPLARY EMBODIMENTS OF THE INVENTION

Exemplary embodiments of the present invention will now be described with reference to the attached drawings.

Figure 1:
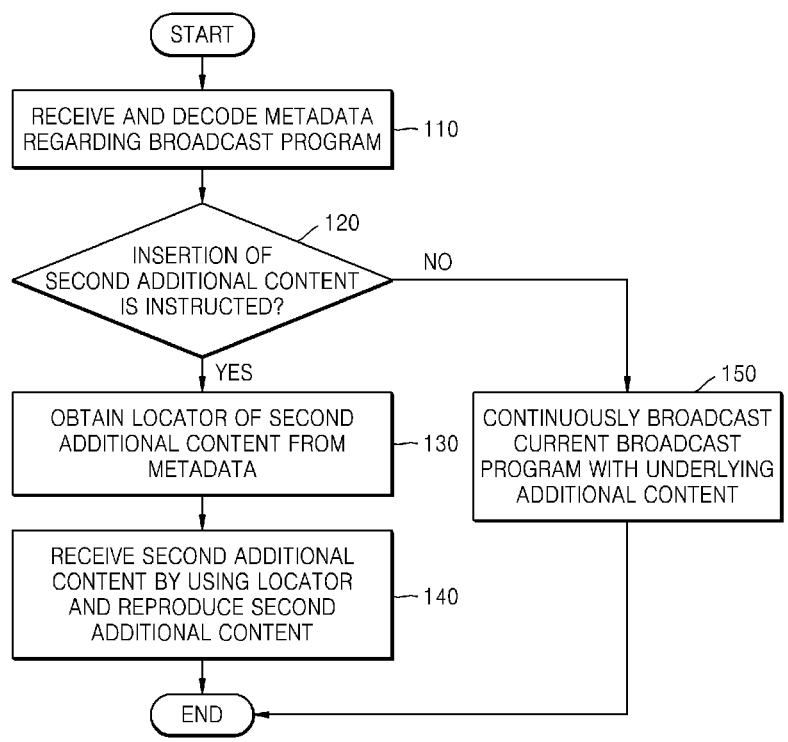
FIG. 1 is a flowchart of a method of providing additional content according to an exemplary embodiment of the present invention.

FIG. 1 is a flowchart of a method of providing additional content according to an embodiment of the present invention.

Referring to FIG. 1, a digital broadcast reception apparatus receives and decodes metadata regarding a broadcast program (operation 110). Metadata includes not only information regarding the broadcast program, but also information regarding additional content. Information regarding additional content includes information instructing either to reproduce first additional content, which is underlying additional content included in the broadcast program, or to insert and reproduce a second additional content, and includes a locator of the second additional content.

If it is determined that metadata instructs to insert the second additional content (operation 120), a locator of the second additional content is obtained from the metadata (operation 130). A digital broadcast reception apparatus receives the second additional content by using the obtained locator and reproduces the second additional content (operation 140). If it is determined that metadata instructs to broadcast the first additional content, which is underlying additional content included in the broadcast program, in the operation 120, the broadcast program, which a user may be watching, is continuously broadcasted together with the first additional content without performing insertion of other additional contents (operation 150).

Figure 2:
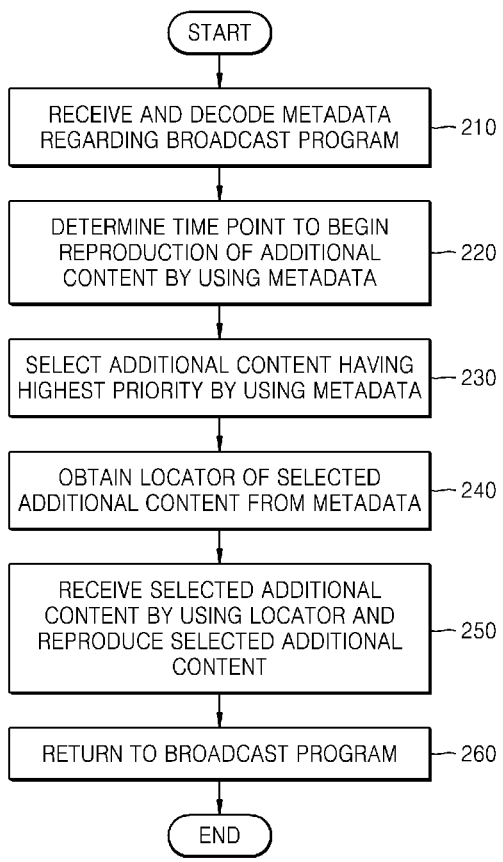
FIG. 2 is a flowchart of a method of providing additional content according to another exemplary embodiment of the present invention.

FIG. 2 is a flowchart of a method of providing additional content according to another embodiment of the present invention.

Referring to FIG. 2, a digital broadcast reception apparatus receives and decodes metadata regarding a broadcast program (operation 210). Metadata includes not only information regarding the broadcast program, but also information regarding additional content. Information regarding additional content may include information instructing which of additional contents is to be reproduced, and may include a locator of additional content to be reproduced. Metadata may include information indicating a time point to begin reproduction of additional content and a time length of additional content. In this case, time points to begin and to finish reproduction of additional content and a time point to return to the broadcast program are determined based on the time information above.

A time point to begin reproduction of additional content is determined by using metadata (operation 220). At the time point to begin reproduction of additional content, a digital broadcast reception apparatus selects additional content to reproduce by using information included in metadata (operation 230). It may be determined whether to insert second additional content instead of first additional content by using priority information included in metadata. It is determined whether to insert and/or reproduce additional content having higher priority by comparing priorities of each of additional contents.

After obtaining a locator of selected additional content from metadata (operation 240), the selected additional content is received by using the obtained locator and is reproduced (operation 250). If it is instructed to insert second additional content, the second additional content is inserted and reproduced precisely at a time point of insertion based on time information. If it is instructed to reproduce first additional content, the first additional content, which is underlying additional content included in the broadcast program, is received and reproduced. Metadata may also include a locator of first additional content. In this case, a digital broadcast reception apparatus receives first additional content by using the locator and reproduces the first additional content. Locators of first and second additional contents may be written in the form of uniform resource identifiers (URI) in metadata. When reproduction of additional content is completed, a broadcast program, which was being reproduced prior to the additional content, is restored (260).

Figure 3:
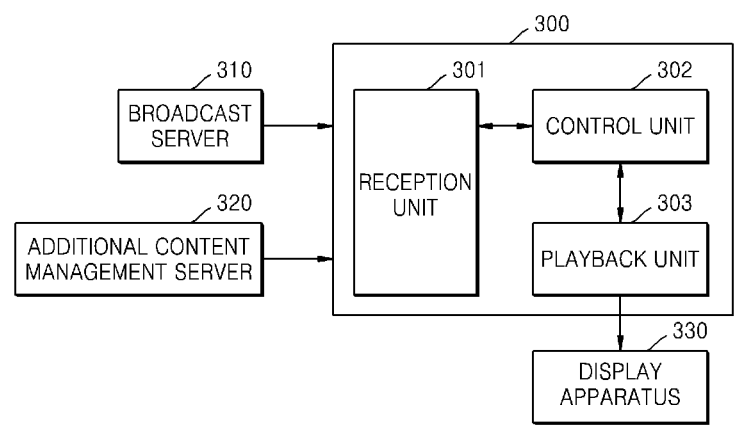
FIG. 3 is a block diagram of a digital broadcast reception apparatus according to another exemplary embodiment of the present invention.

FIG. 3 is a block diagram of a digital broadcast reception apparatus according to another embodiment of the present invention.

Referring to FIG. 3, a digital broadcast reception apparatus 300 includes a reception unit 301 which receives a broadcast program and metadata regarding the broadcast program from a broadcast server 310 and receives additional content from an additional content management server 320, a playback unit 303 which reproduces data received by the reception unit 301 and outputs the reproduced data to a display apparatus 330, and a control unit which controls the reception unit 301 and the playback unit 303.

The control unit 302 decodes metadata and determines whether to insert second additional content instead of first additional content, which is underlying additional content included in a broadcast program, and, if it is determined to insert the second additional content, controls the reception unit 301 and the playback unit 303 to receive the second additional content by using a locator of the second additional content included in the metadata and to reproduce the received second additional content. Furthermore, the control unit 302 controls insertion and reproduction of additional content according to the method of providing additional content described above. Accordingly, a broadcast provider controls the digital broadcast reception apparatus 300 by using metadata to provide additional content complying with preferences or demands of a user.

FIG. 4 illustrates metadata in the case where alternative advertisement content is inserted according to another embodiment of the present invention, wherein the present invention is applied to the broadband contents guide (BCG), which is a metadata standard, of the digital video broadcast-internet protocol (DVB-IP), which is an IPDV standardization organization. BCG is metadata including program information and a locator of a broadcast program.

Referring to FIG. 4, information 410 regarding two additional contents are written in a <RelatedMaterial> element by using a <MediaLocator> tag. According to the current embodiment, first additional content is underlying advertisement content included in a broadcast program, and second additional content, which can be inserted instead of the first additional content, is an additional advertisement content. <MediaLocator> elements 411 and 413 include locators 412 and 414 of advertisement contents in the form of URI, and "priorities," which indicate reproduction priorities of the advertisement contents, are defined as attributes of the locators. Referring to the first <MediaLocator> element 411, it is clear that the priority of the underlying advertisement content is 0x01 and content to be reproduced is adbreak1_underlying.html. Referring to the second <MediaLocator> element 413, it is clear that the priority of the additional advertisement content is 0x00 and content to be reproduced is adbreak1_insertion.html. Furthermore, a <SegmentLocator> element includes information 420 regarding a time point for advertisement, and includes sub-elements such as a <MediaRelTimePoint> element 421 for indicating a time point to begin advertisement as relative time and a <MediaDuration> element 422 for indicating time length of advertisement.

Among advertisement contents defined by the <MediaLocator> elements, advertisement content having the highest priority, i.e. advertisement content having the smallest priority attribute value, is reproduced. Therefore, in the embodiment of FIG. 4, the additional advertisement content adbreak1_insertion.html of which the priority attribute value is 0x00 is broadcasted. The priority attribute value 0x00 can be defined to be used only for additional advertisement content. Furthermore, it may be defined to use values equal to or greater than 0x01 for underlying advertisement content. By using the priority attribute, an advertisement inserting function can be activated or deactivated by only adjusting the relative values of the priorities of additional advertisement content and of underlying advertisement content, rather than adding or removing <MediaLocator> elements. Accordingly, a broadcast provider can provide advertisements customized to each of users (reception apparatuses) by inserting information for user customized advertisement in metadata. Therefore, a time duration in which users watch advertisements can be maximized, and thus the effect of advertisements can be improved.

FIG. 5 illustrates metadata in the case where alternative advertisement content is not inserted according to another embodiment of the present invention.

Referring to FIG. 5, a priority attribute value 501 of additional advertisement content is changed to 0x02, which is greater than the value 0x01 of the underlying advertisement content. Therefore, the underlying advertisement content http://advertisement.co.kr/ads/adbreak1_UNDERLYING.html, which has the highest priority (that is, having the lowest priority attribute value), is broadcasted.

If required, the address of advertisement content included in a <MediaUri> element may have various formats as shown below.

1. In the case of transmitting an advertisement via web page:

```
<mpeg7:MediaUri>
http://advertisement.co.kr/ads/adbreak1_INSERTION.html
</ mpeg7:MediaUri>
```

2. In the case of transmitting an advertisement via Unicast:

```
    (1) In the case of Pull method
* syntax format: protocolName://address of a content
* <mpeg7:MediaUri>
http://advertisement.co.kr/ads/adbreak1.mpg
</mpeg7:MediaUri>
    (2) In the case of Push method
* syntax format: protocolName://unitcastIP:unitcastPort
<mpeg7:MediaUri>rtp://192.168.100.166:1234</mpeg7:MediaUri>
```

In the case of transmitting an advertisement via Multicast

```
* Syntax format: protocol://multicastIP:multicastPort
* <mpeg7:MediaUri>rtp://224.10.10.1:1234</mpeg7:MediaUri>
```

While the present invention has been particularly shown and described with reference to exemplary embodiments thereof, it will be understood by those of ordinary skill in the art that various changes in form and details may be made therein without departing from the spirit and scope of the present invention as defined by the following claims. The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The invention can also be embodied as computer readable codes on a computer readable transmission medium. An example of a computer readable transmission medium is carrier waves (such as data transmission through the Internet). The computer readable recording medium can also be distributed over network coupled computer systems so that the computer readable code is stored and executed in a distributed fashion.

What is claimed is:

1. A non-transitory information storage medium storing metadata regarding a broadcasting program for providing additional content during the broadcast program, the metadata comprising:
    information regarding the broadcast program;
    information regarding the additional content; and
    the metadata is received along with the broadcast program from a broadcast server;
    wherein the information regarding the additional content comprises:
    information indicating whether to reproduce second additional content instead of first additional content, which is underlying additional content of the broadcast program;
    information regarding a time point to reproduce the first additional content or a time point to reproduce the second additional content which is decoded;
    information indicating a duration of the first additional content or a duration of the second additional content; and
    a locator of the second additional content, wherein the locator of the second additional content is written in form of uniform resource identifier (URI), wherein the locator has various formats;
    wherein the information indicating whether to reproduce the second additional content comprises priority information with respect to the first additional content and the second additional content, and instructs one of the first additional content and the second additional content having a higher priority value to be reproduced, and
    wherein the second additional content is reproduced instead of the first additional content in response to a priority value of the second additional content is determined to be higher than a predetermined priority value of the first additional content,
    wherein the second additional content is reproduced by adjusting a priority value of one of the second additional content and the first additional content.

2. The non-transitory information storage medium of claim 1, the metadata further comprising a locator of the first additional content.

3. The non-transitory information storage medium according to claim 1, wherein the metadata comprises broadband contents guide (BCG) metadata.

4. The non-transitory information storage medium according to claim 1, wherein the priority information comprises a numerical value indicating a priority of the first additional content and the second additional content.

5. A method of providing additional content, the method comprising:
- receiving metadata regarding a broadcast program along with the broadcast program from a broadcast server, the metadata comprising information regarding the broadcast program and information regarding the additional content;
- decoding, using a decoder, the metadata and determining whether to reproduce second additional content instead of first additional content, wherein the first additional content is underlying additional content of the broadcast program, by using the information regarding the additional content in the metadata;
- in response to the determining whether to reproduce the second additional content instead of first additional content, obtaining a locator included in the metadata of the second additional content from the information regarding the additional content in the metadata,
- wherein the locator of the second additional content is written in a form of a uniform resource identifier (URI), wherein the locator has various formats;
- decoding the metadata and determining a time point included in the metadata to begin reproduction of the first additional content or a time point included in the metadata to begin reproduction of the second additional content;
- decoding the metadata and determining a duration included in the metadata of the first additional content or a duration of the second additional content; and
- receiving the second additional content by using the obtained locator and reproducing the second additional content based on the time point to begin reproduction of the second additional; content;
- wherein the determining of whether to reproduce the second additional content comprises:
- comparing a priority value of the first additional content and a priority value of the second additional content, the priority values being included in the metadata; and
- determining one of the first additional content and the second additional content having a higher priority value to be reproduced,
- wherein the second additional content is reproduced instead of the first additional content in response to the priority value of the second additional content is determined to be higher than a predetermined priority value of the first additional content,
- wherein the second additional content is reproduced by adjusting a priority value of one of the second additional content and the first additional content.

6. The method of claim 5, further comprising:
- if it is determined to reproduce the first additional content, obtaining a locator of the first additional content from the metadata; and
- receiving the first additional content by using the locator and reproducing the first additional content.

7. A non-transitory computer readable recording medium having recorded thereon a program that causes a computer to execute the method of claim 5.

8. A digital broadcast reception apparatus comprising:
- a reception unit receives metadata regarding a broadcast program along with the broadcast program from a broadcast server, the metadata comprising information regarding the broadcast program and information regarding additional content, wherein the metadata further comprises:
- information regarding a time point to reproduce a first additional content or a time point to reproduce a second additional content,
- information indicating a duration of the first additional content and a duration of the second additional content, and
- a locator of the second additional content, wherein the locator of the second additional content is written in a form of a uniform resource identifier (URI), wherein the locator has various formats;
- a playback unit produces data received by the reception unit; and
- a control unit determines whether to reproduce the second additional content instead of the first additional content, wherein the first additional content is underlying additional content of the broadcast program included in the metadata, by using the information regarding the additional content in the metadata,
- the control unit decodes the metadata and determines the time point to begin reproduction of the first additional content or the time point to begin reproduction of the second additional content, and
- in response to determining whether to reproduce the second additional content instead of first additional content, controls the reception unit and the playback unit to receive the second additional content by using the locator of the second additional content and to reproduce the second additional content based on the time point to reproduce the second additional content,
- wherein the control unit compares a priority value of the first additional content and a priority value of the second additional content and determines the additional content having a higher priority to be reproduced, wherein the first priority value and the second priority value are included in the metadata,
- wherein the second additional content is reproduced instead of the first additional content when a priority value of the second additional content is determined to be higher than a predetermined priority value of the first additional content,
- wherein the second additional content is reproduced by adjusting a priority value of one of the second additional content and the first additional content.

9. The digital broadcast reception apparatus of claim 8, wherein, if it is determined to reproduce the first additional content, the control unit controls the reception unit and the playback unit to receive the first additional content by using a locator thereof included in the metadata and to reproduce the first additional content.

* * * * *